United States Patent [19]

Brown

[11] 4,122,604
[45] Oct. 31, 1978

[54] LUMBER FORMING ATTACHMENT FOR CHAIN SAWS

[76] Inventor: Arnold E. Brown, West Point, Calif. 95255

[21] Appl. No.: 848,766

[22] Filed: Nov. 4, 1977

[51] Int. Cl.² ................ B27B 27/02; B27B 27/10
[52] U.S. Cl. ................................ 30/371; 83/745
[58] Field of Search ............ 30/371, 381, 382; 83/795, 794

[56] References Cited

U.S. PATENT DOCUMENTS

| | | | |
|---|---|---|---|
| 3,134,409 | 5/1964 | Hayden | 30/371 |
| 3,213,906 | 10/1965 | McManana | 83/394 X |
| 3,225,799 | 12/1965 | Hayden et al. | 30/371 |
| 3,965,788 | 6/1976 | Granberg | 30/371 X |
| 4,070,757 | 1/1978 | Granberg et al. | 30/371 |

*Primary Examiner*—Jimmy C. Peters
*Attorney, Agent, or Firm*—Francis X. LoJacono, Sr.

[57] ABSTRACT

A device to produce lumber from logs, wherein the device is arranged to be attached to a portable chain saw so as to be adjustable to provide various board thicknesses. The device comprises a frame structure having a plurality of laterally spaced support struts secured in spaced relationship to each other by longitudinally arranged rod members. At least two rod members include front and aft drive rollers which are operably connected by a drive-train system including a power motor arrangement whereby the device, along with the chain saw, is continuously fed in a longitudinal cutting direction along the length of the log being cut. The thickness of the lumber being cut is determined by the setting of a thickness control dial unit operably mounted in conjunction with rack and pinion members, wherein the rack members are directly attached to the chain-saw bar.

6 Claims, 6 Drawing Figures

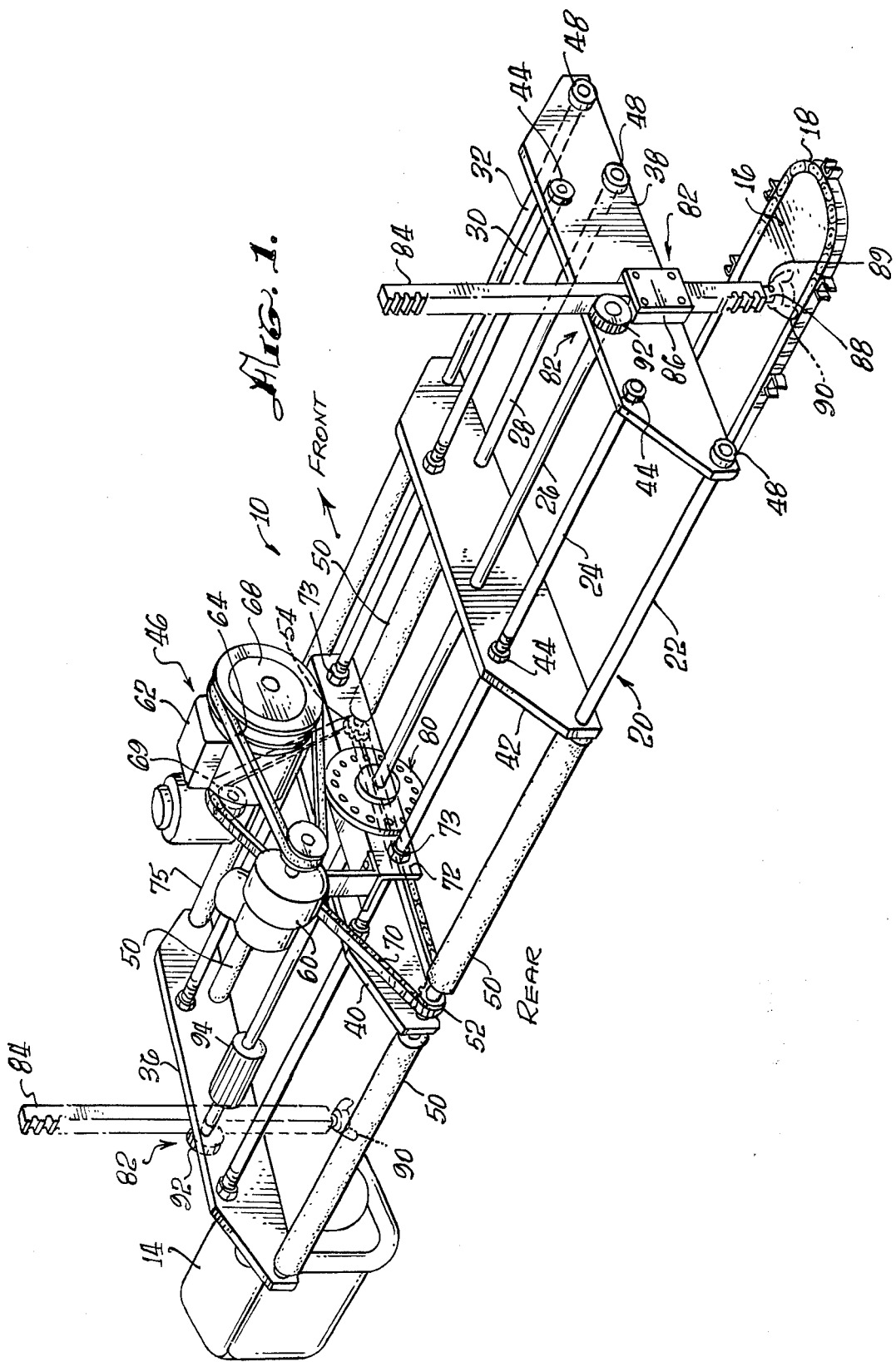

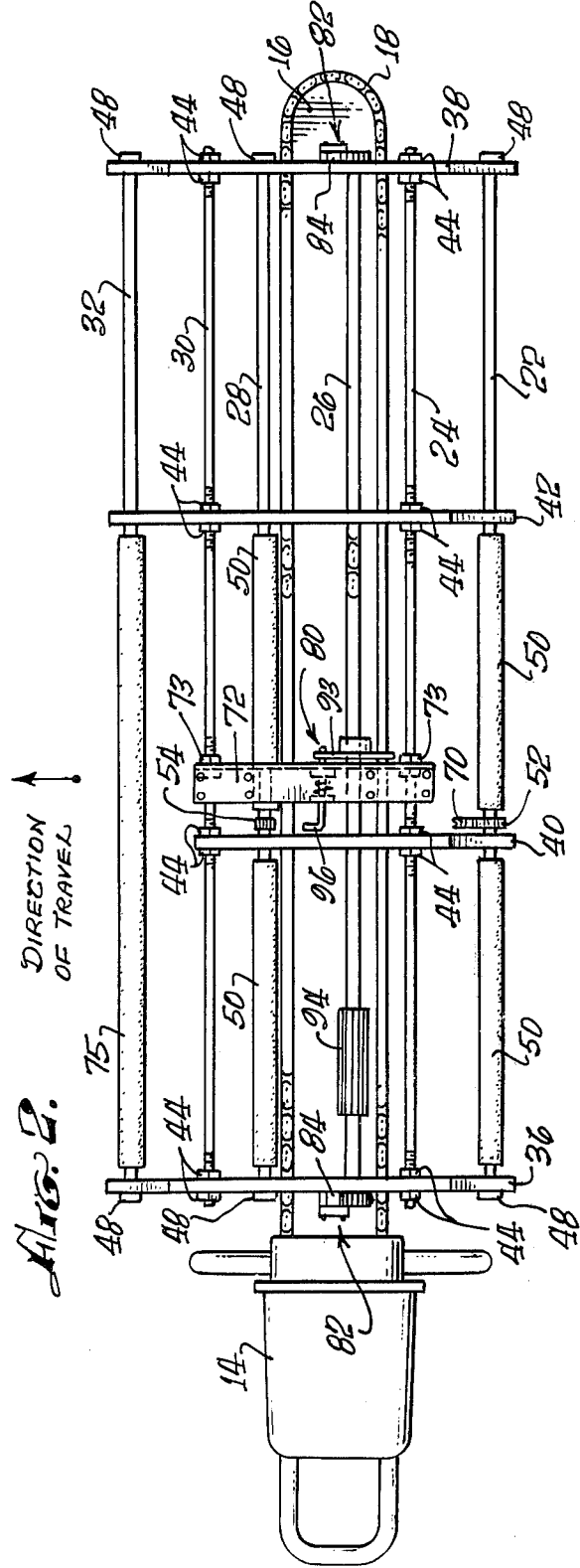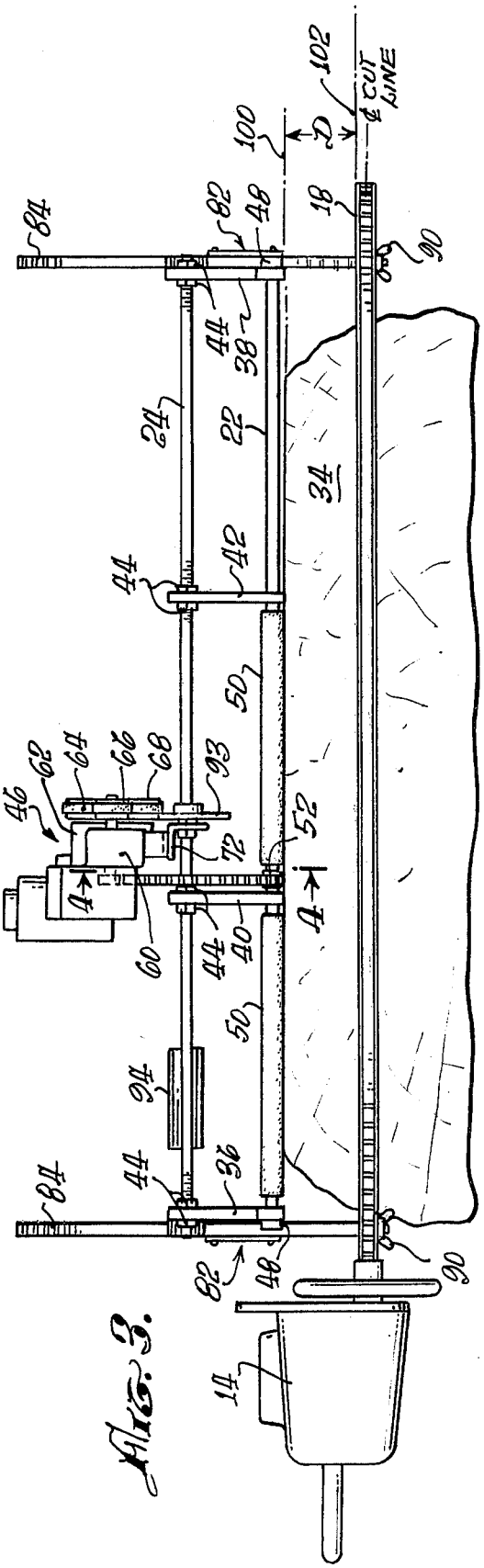

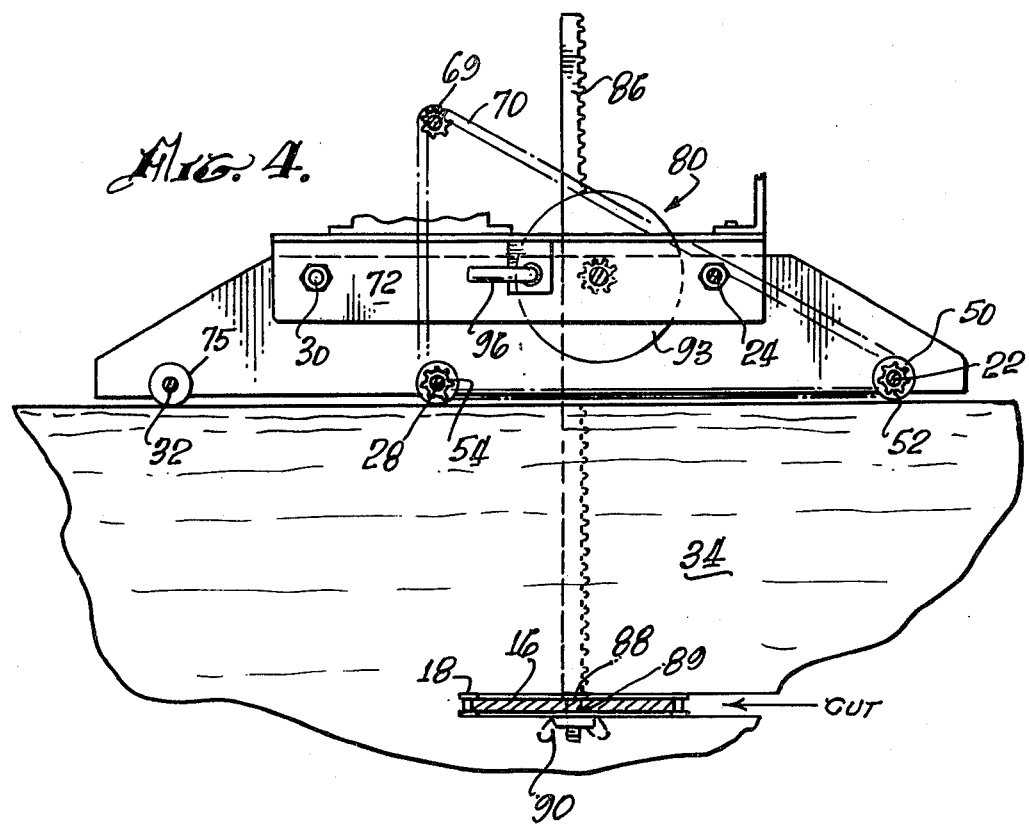
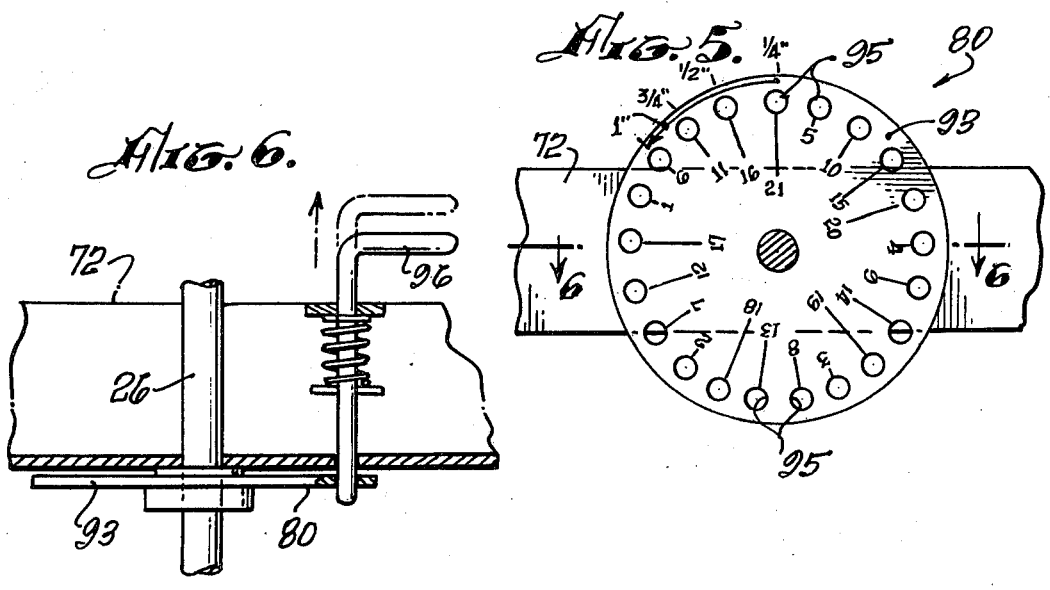

LUMBER FORMING ATTACHMENT FOR CHAIN SAWS

BACKGROUND OF THE INVENTION

1. Field of the Invention

This invention relates generally to a chain-saw attachment and, more particularly, to an attachment whereby a log can be cut lengthwise in a reclining position, thus being capable of producing longitudinal flat boards of various desired thicknesses.

2. Description of the Prior Art

As is well known in the art, various problems and difficulties are encountered in providing suitable means for cutting logs lengthwise, in order to produce a smooth elongated board having a continuous thickness throughout its length.

Several types of attachments have been tried and some are presently being used to cut lengthwise boards of various thicknesses. However, these devices have features that restrict their use, and some are complicated to operate and expensive to maintain. One such device is shown in U.S. Pat. No. 3,926,086 and others in U.S. Pat. No. 3,225,799 and 3,134,409.

SUMMARY OF THE INVENTION

The present invention provides an improved lumber-forming attachment for chain saws, wherein a conventional chain saw is readily adapted to the secured to the attachment to make a longitudinal, lengthwise cut in a log whereby boards, posts, mining timber, large beams, etc., can be readily formed.

The present preferred arrangement of the device comprises a carriage defined by a frame structure having a plurality of laterally spaced support struts which are fixedly disposed along a plurality of rod members, whereby the rods are laterally spaced apart from each other and secured in this manner by the end struts and intermediate struts, wherein the rods will laterally traverse the log when the carriage is placed thereon.

At least two of the rods are provided with drive rollers which are driven by a power system having a motor-and-chain drive operably connected thereto. Thus, the lumber-making device is self-propelled along the full length of the log, while the chain saw is operated separately by its conventional motor — which is well known in the industry. Once the carriage — together with the chain saw — is set on the log and the controls properly fixed, it will be self-operating, whereby the operator is not required to handle the carriage until it reaches the end of the log.

Further, included therein is a means by which the thickness of each cut is easily selected and set. That is, a thickness-selection dial is provided and is operably attached to a pair of rack-and-pinion-adjusting devices disposed at each end of the carriage. The chain saw is mounted to the racks in such a manner that, when the dial is being set, the racks will raise or lower the chain saw to the proper cutting position. The dial may be provided with any suitable calibration; however, in most applications, it will allow for adjustments as small as one-quarter of an inch.

The present device can be made to adjust widthwise to accommodate all sizes of logs, up to 5 feet in diameter.

OBJECTS AND ADVANTAGES OF THE INVENTION

The present invention has for an important object to provide a portable device that is adapted to carry a conventional chain saw for cutting logs along their longitudinal length, whereby boards of various thicknesses can be cut.

It is another object of the invention to provide a lumber-forming attachment for chain saws, including a thickness-dialing means whereby the thickness of a board is accurately selected by the simple means of adjusting a dial connected to a pair of racks and pinions.

It is still another object of the invention to provide a lumber forming attachment for chain saws wherein the attachment is self-fed in a cutting engagement with the log by a separate power-drive means from that of the chain saw.

It is a further object of the invention to provide an attachment, for use with a conventional chain saw for the purpose of cutting various sized timbers, that is easy to operate, service and maintain.

It is a still further object of the invention to provide a device of this character having relatively few operating parts.

Still another object of the invention is to provide a device of this character that is relatively inexpensive to manufacture.

It is still a further object of the invention to provide a lumber forming attachment for chain saws that is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a perspective view of the invention;

FIG. 2 is a top-plan view thereof;

FIG. 3 is a side-elevational view showing a log being cut and wherein the thickness of the lumber being cut is between the drive rollers and the saw;

FIG. 4 is a cross-sectional view taken substantially along line 4—4 of FIG. 3;

FIG. 5 is a plan view of the thickness-adjusting dial; and

FIG. 6 is a cross-sectional view thereof taken along line 6—6 of FIG. 5.

DESCRIPTION OF THE PREFERRED EMBODIMENT

Referring more particularly to the accompanying drawings, there is shown a lumber-forming attachment, generally indicated at 10, having mounted thereto a conventional chain saw, indicated generally at 12. As is well known, the conventional chain saw includes a chain-saw motor 14 having a horizontal, elongated, chain-saw-guide bar 16 on which is arranged a continuous saw chain 18 in a typical manner and driven by said chain-saw motor 14.

Accordingly, the lumber-forming attachment is affixed to the chain saw, wherein the attachment comprises a carriage, generally designated at 20. Carriage 20 is formed by a structural frame having a plurality of laterally spaced structural rods or bars 22, 24, 26, 28, 30 and 32.

The bars or rods are juxtapositioned to each other in parallel relation, and extend from one end of the carriage to the other. When said carriage is positioned on a log 34, such as seen in FIG. 3, the rods traverse the width of the log. Thus, the carriage, together with the chain saw, can move along the entire axial length of said log 34.

Bars 22 through 32 are held in place by a plurality of strut members which include a pair of end struts 36 and 38, and intermediate struts 40 and 42, respectively. Bars 22, 28 and 32 are mounted in the lower portions of each strut member.

However, it should be understood that bars 24 and 30 are fixedly secured to the struts; and bars 24, 26, 28 and 32 are rotatably journaled in the strut members — which will be hereinafter described with respect to the drive means.

Since struts 36, 38, 40 and 42 must be held in place, rods or bars 24 and 30 are provided with threads on which nuts 44 are received. Nuts 44 are positioned on opposite sides of the respective strut members and secured in place as seen in FIG. 2.

Thus, the strut members and the rods establish a carriage attachment. However, included within the carriage structure there is also a drive means, which includes bar members 22 and 28. In order to allow for a continuous smooth cut of the log along its length, the chain saw must be fed at a predetermined speed throughout the length of the log to be cut. This is accomplished by driving rear drive bar 22 and forward drive bar 28 with a power means, generally indicated at 46 and seen in FIGS. 1 and 3.

The drive means comprises drive bars 22 and 28 wherein each bar is journaled in bearings 48 on each end strut 36 and 38, bars 22 and 28 being further rotatably received through struts 40 and 42. To provide direct drive contact between the surface of the lumber being cut and the driving bars 22 and 28, there is included a plurality of drive rollers 50 which are formed as part of bars 22 and 28. Drive sprockets 52 and 54 are respectively secured to bars 22 and 28, wherein the power means 46 is operably engaged in order to rotate bars 22 and 28.

Power means 46 comprises a gasoline motor 60 interconnected to a speed-reduction-drive means 62, wherein motor 60 drives reduction drive 62 by a belt drive 64 and pullies 66 and 68 attached respectively to motor 60 and reduction drive 62. Accordingly, reduction drive 62 includes a drive sprocket 69, whereby a sprocket chain 70 operably interconnects sprockets 52, 54 and 69; and, thus, rotational drive is imparted from motor 60, through the drive system, and into drive bars 22 and 28, and rollers 50.

Once the chain saw is started and the power means 46 is actuated, the carriage together with saw 12 traverses the full length of the log without further assistance from an operator.

It should be understood that various suitable arrangements can be provided for means to mount motor 60 and reduction drive 62 to carriage 10; and one such way is herein shown, wherein an angle-support bracket 72 is affixed to bars 24 and 30 by nuts 73.

In addition to rollers 50, there is also included a forward, free-rolling, guide roller 75 which mounts to rotatable rear bar 32. This provides a stabilizing guide means to prevent the carriage from moving out of longitudinal alignment with the longitudinal axis of the log being cut.

However, it should be noted that, before the power means and the chain saw motor are started, the saw chain must be adjusted with respect to the carriage, whereby the lumber thickness is determined.

Accordingly, there is provided an adjusting means to control the lumber thickness, wherein this adjusting means (generally indicated at 80) includes means for attaching saw 12 to carriage 10. The attaching means comprises a pair of rack-and-pinion devices, designated at 82, each being located on opposite ends of carriage 10; that is, each rack 84 is slidably mounted to end struts 36 and 38 by block mounts 86. The lower terminating end of the rack is provided with a threaded stud member 88 which is adapted to be received through holes 39 disposed in chain-saw blade 16, wherein blade 16 is held thereon by wing nut 90 or any other suitable type fastener. The pinion gears 92 are attached to each terminating end of rotatable rod or bar 26, and engage the respective rack 84. Thus, as bar 26 is rotated by hand, the rack is raised or lowered, and thus adjusts the chain saw up or down with respect to the underside of carriage 10. Bar 26 includes a gripping member 94, whereby the operator needs only to grab the grip and twist it to transmit motion to the rack-and-pinion device 82. Thus, the carriage and chain blade 18 are always juxtaposed in a parallel relationship to each other.

As previously mentioned, a selective thickness-control means is included and comprises a calibrated dial member which comprises an indexing plate 93 fixedly secured to bar 26 adjacent bracket 72. This dial is arranged with a plurality of setting holes 95 which are disposed in an annular placement, representing various degrees of board thicknesses. Thus, as seen in FIG. 5, holes 95 are positioned so as to allow an up or down adjustment of the chain saw in one-quarter inch steps.

The adjustment setting is accomplished by removing a spring-biased locking pin 96 from a hole, and then rotating bar 26 to another hole that provides the necessary board thickness required.

Accordingly, if a 4-inch thick plank is required, the index plate is rotated — wherein the hole marked "4" is aligned to receive lock pin 96. The distance "D" between the top of log 34 — indicated by line 100 in FIG. 3 — and the cutting line 102 of the saw will be approximately 4 inches thick. Thus, by adjusting the index plate, various size thicknesses of lumber can be readily cut in an easy and simple manner.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A lumber-forming attachment for chain saws adapted to make a longitudinal cut in a log, the chain saw including a saw chain, a chain blade, and a motor to operate said saw chain thereon, said attachment comprising:
- an elongated carriage having a structural frame to be transversely supported across the longitudinal axis of said log;
- drive means mounted as part of said structural means engageable with said log for longitudinal movement along the length of said log;
- power means operably connected to said drive means to power said drive means independently of said chain saw;
- guide means mounted on said carriage and positioned rearward of said drive means;
- means for adjusting said chain saw in a predetermined position with respect to said carriage, and in a horizontal parallel relationship thereto; and
- a selective-thickness-control means operably connected to said adjusting means and mounted to said carriage.

2. An attachment for chain saws as recited in claim 1, wherein said adjusting means comprises:
- a longitudinal bar member rotatably supported on said carriage;
- a pair of rack-and-pinion means wherein said racks are slidably mounted to the ends of said carriage, and said pinions are secured to the ends of said rotatable bar member and arranged for engagement with said racks; and
- securing means mounted to said racks whereby said chain blade is mounted to said racks for movable adjustment therewith.

3. An attachment for chain saws as recited in claim 2, wherein said selective-thickness-control means comprises:
- a calibrated dial defining an index plate having a plurality of holes disposed therein representing various degrees of board thicknesses; and
- a spring-biased locking pin arranged to be selectively received in one of said holes.

4. An attachment for chain saws as recited in claim 3, wherein said carriage comprises:
- a plurality of longitudinal rod members;
- a plurality of transverse strut members for securing said rod members in a laterally spaced arrangement to each other; and
- means for securing said rod members to said strut members.

5. An attachment for chain saws as recited in claim 4, wherein said drive means comprises:
- a forward-drive roller;
- a rear-drive roller, said rollers being arranged in parallel relationship to each other and said rod members for direct contact with said log;
- and wherein said guide means comprises a forward, free-rolling roller being in the same horizontal plane as said forward and rear rollers.

6. An attachment for chain saws as recited in claim 5, wherein said power means comprises:
- a motor mounted to said carriage structure;
- a speed-reduction-drive means operably connected to said motor; and
- a chain drive connected between said speed-reduction means and said drive rollers, whereby said rollers are rotated at a controlled rate.

* * * * *